UNITED STATES PATENT OFFICE.

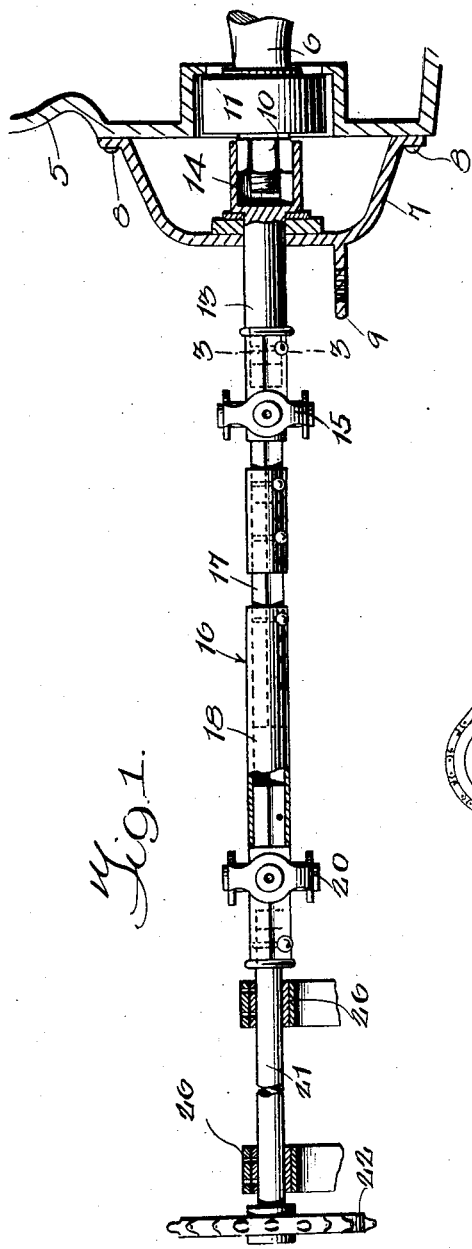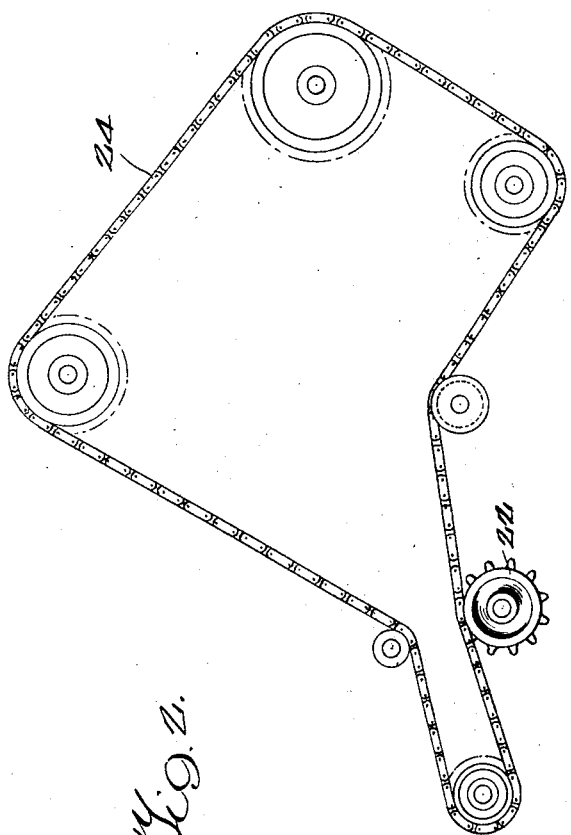

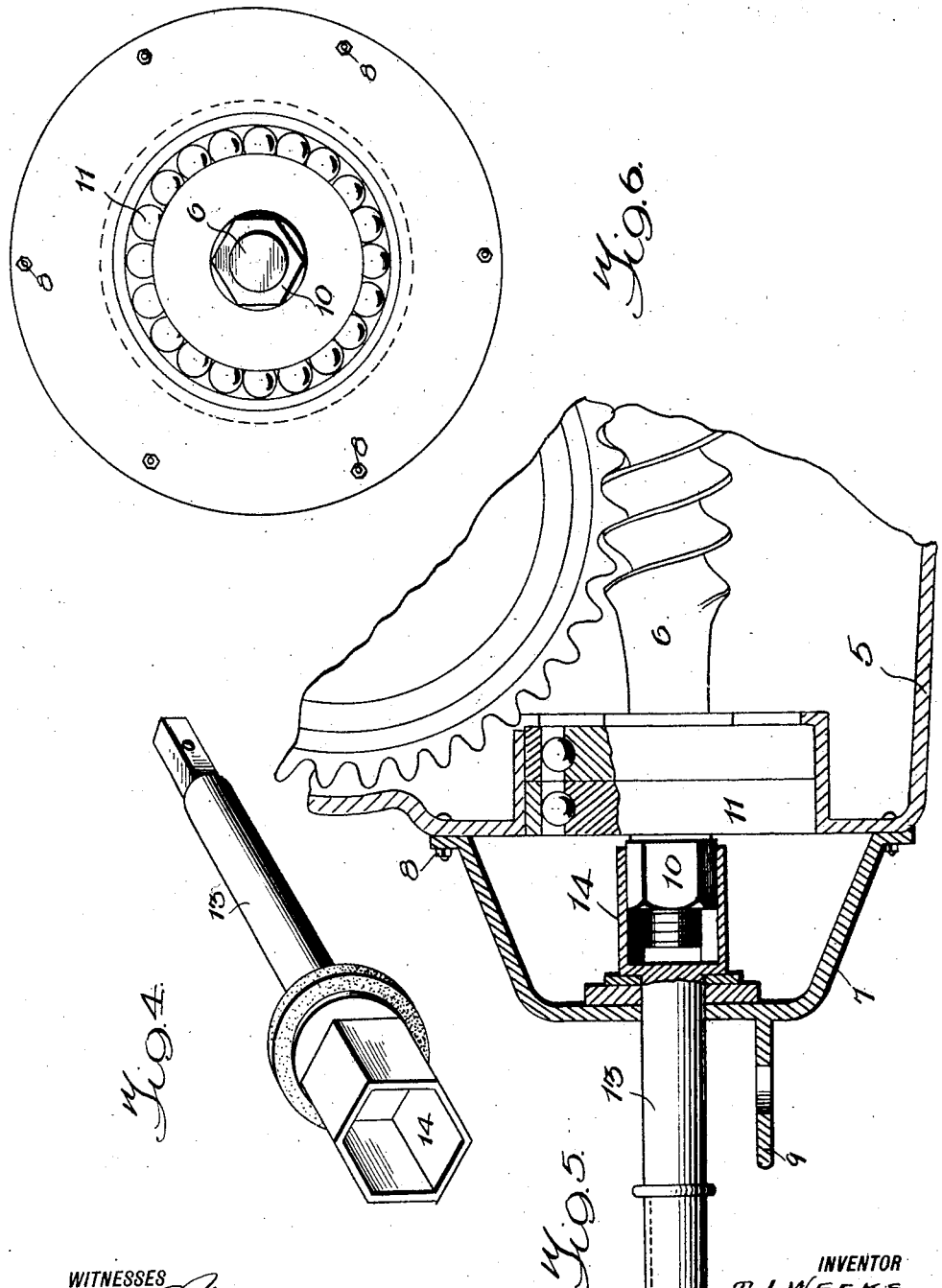

THOMAS J. WEEKS, OF MONTGOMERY, MISSOURI.

POWER-TRANSMITTING DEVICE.

1,403,880.

Specification of Letters Patent. Patented Jan. 17, 1922.

Application filed September 30, 1921. Serial No. 504,423.

*To all whom it may concern:*

Be it known that I, THOMAS J. WEEKS, a citizen of the United States, and resident of Montgomery, in the county of Montgomery and State of Missouri, have invented certain new and useful Improvements in Power-Transmitting Devices, of which the following is a specification.

This invention relates to power transmitting devices especially adapted for use on Fordson tractors.

An important object is to provide a power transmitting device having novel means whereby the power from a Fordson tractor may be transmitted to a binder so as to operate the binder when the bull wheel of the same cannot obtain traction with the ground.

Another object is to provide a power transmitting device of the character described which may be applied to a Fordson tractor without altering the construction of the same and which is neat in appearance and cheap to manufacture.

Other objects and advantages of the invention will be apparent during the course of the following description.

In the accompanying drawing forming a part of this application and in which like numerals are employed to designate like parts throughout the same, Figure 1 is a side elevation of the improved power transmitting device in use.

Figure 2 is an end elevation of the sprocket wheel of the power transmitting device, the said wheel being shown in connection with the binder operating chain.

Figure 3 is a transverse sectional view taken on line 3—3 of Figure 1.

Figure 4 is a perspective of a shaft embodied in the invention.

Figure 5 is a detail sectional view of the tractor differential, the power transmitting device being shown in connection therewith.

Figure 6 is a fragmentary rear end elevation of the tractor, the draw bar cap being removed.

In the drawing the numeral 5 designates an axle or differential housing of a Fordson tractor and the numeral 6 designates the usual rearwardly extending worm which drives the differential and the rear axles of the tractor. With reference to Figure 1 it will be seen that a drawbar cap 7 is extended over the rear end of the worm 6 and is secured to the housing by means of bolts 8 or other suitable fastening devices. The draw bar cap 7 is provided adjacent its lower end with a rearwardly directed apertured lug 9 by means of which the tractor may be connected to a binder or other load. The invention forming the subject matter of this application is in the nature of a power transmitting device adapted to be connected to the hexagonal nut being arranged rearwardly of the bearing 11 for the worm.

As illustrated in Figure 1 a stub shaft 13 is rotatably extended through the draw bar cap 7 and is provided with a hexagonal head or socket member 14 which snugly receives the hexagonal nut 10 and thereby provides a driving connection between the worm and the stub shaft. The stub shaft 13 is also provided with a universal joint 15 which permits the shaft to turn slightly when the binder or the like propelled by the tractor encounters an inequality in the line of travel. An extensible shaft generally designated by the numeral 16 is connected to the rear end of the shaft 13 and consists of inner and outer section 17 and 18 respectively, the said sections being slidable with relation to each other so that the effective length of the extensible section 16 may be regulated as the occasion requires. The rear portion of the extensible shaft 16 is provided with a second universal joint 20 which functions in a manner similar to the universal joint 14 and is connected to a shaft 21 having a sprocket or gear wheel 22.

The sprocket wheel 22 is adapted to be connected to the drive chain 24 of a binder so as to dispense with the necessity of operating the binder from the bull wheel. When operating on slippery ground or ground which is soft as a result of continued rain the bull wheel of the binder does not have sufficient traction with the ground to operate the binder and by the use of the improved power transmitting device the power of the tractor may be utilized to operate the binder. The shaft 21 may be extended through bearings 26 carried by the binder.

Having thus described the invention what I claim is:—

1. The combination with a tractor having a power transmitting member and a draw bar cap receiving the terminal portion of the power transmitting member, of a power transmitting shaft rotatably extending through and supported by said draw bar cap and having means engaging said first named power transmitting member, and means associated with said shaft for connecting the same with an apparatus to be driven.

2. The combination with a tractor having a power transmitting member and a draw bar cap receiving the terminal portion of the power transmitting member, and a shaft rotatably extending through said draw bar cap and supported by the same, said shaft being provided with a head having a socket receiving the terminal portions of said power transmitting member, said shaft being extensible.

3. The combination with a tractor having a power transmitting member and a draw bar cap receiving the terminal portion of the power transmitting member, a shaft rotatably extended through said draw bar cap and supported by the same, said shaft being provided with a head having a socket receiving the terminal portions of said power transmitting member, said shaft being extensible, and a power transmitting wheel on said shaft.

4. The combination with a tractor having a worm, of a draw bar cap receiving the terminal portion of said worm, and a shaft extended through and rotatably supported by said draw bar cap and provided with a head having a socket receiving the terminal portion of said worm thereby establishing a driving connection between the worm and the shaft.

THOMAS J. WEEKS.